W. H. SARGENT.
GEARING.
APPLICATION FILED JAN. 23, 1917.
1,285,408.
Patented Nov. 19, 1918.
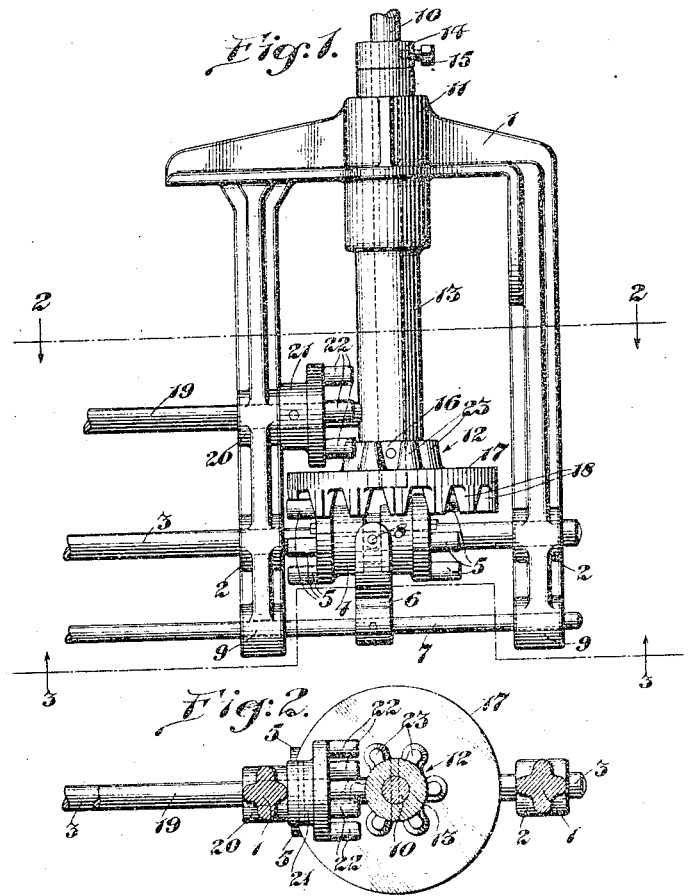
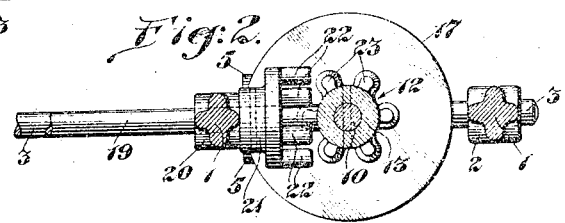
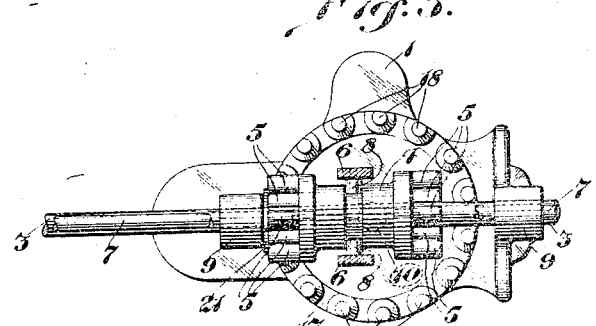
Attest.
Charles A. Becker.
Inventor:
William H. Sargent
His Attorneys.

UNITED STATES PATENT OFFICE.

WILLIAM H. SARGENT, OF ST. LOUIS, MISSOURI, ASSIGNOR TO WAYNE MANUFACTURING COMPANY, OF ST. LOUIS, MISSOURI, A CORPORATION OF MISSOURI.

GEARING.

1,285,408.  Specification of Letters Patent.  Patented Nov. 19, 1918.

Application filed January 23, 1917. Serial No. 143,906.

*To all whom it may concern:*

Be it known that I, WILLIAM H. SARGENT, a citizen of the United States, residing in the city of St. Louis and State of Missouri, have invented a new and useful Gearing, of which the following is a specification.

This invention relates to improvements in gearing, and consists in the novel design and arrangement of parts hereinafter more fully disclosed.

An object of the invention is to provide an improved form of gearing, whereby a plurality of transmission shafts may be driven from a common drive shaft arranged to operate continuously in one direction with intermediate connections between the drive shaft and the transmission shafts, whereby the direction of rotation of the transmission shafts may be readily reversed.

Another object of the invention is to provide a gearing construction including a drive shaft and a driven shaft which will be compact in design, durable in construction and simple in its assembly.

Another object of the invention is to provide in a gearing of the class described an improved form of reverse mechanism, whereby the direction of rotation of the driven shaft may be changed at any desired point of the operation and without liability of the gears becoming locked.

Additional advantages attainable from the construction of the invention will be readily recognized without specific mention from the following detailed disclosure thereof taken in connection with the accompanying drawing, in which—

Figure 1 is an elevation of the gearing construction embodying the invention.

Fig. 2 is a sectional plan view of the gearing construction taken substantially on the line 2—2 of Fig. 1.

Fig. 3 is a sectional bottom plan view of the gearing construction taken substantially on the line 3—3 of Fig. 1.

In the embodiment of the invention illustrated in the drawing a gearing support 1 in the form of a yoke-shaped casting is provided as a mounting for the shafts, gears and pinions embracing the gearing construction. In the arms of the support 1 in horizontal alinement are bearing portions 2 in which a drive shaft 3 is mounted. The drive shaft 3 is arranged to be rotated from a suitable prime mover.

A movable element comprising a hub member 4 and a series of teeth 5 at either end is splined or feathered to the shaft 3 intermediate of the arms of the support 1. The teeth 5 are arranged in annular series upon the end faces of the hub member 4 and are rounded in cross section. A bifurcated arm 6 extending at right angles to the hub member 4 and embracing the same is mounted on a rod 7. Pins 8 project inwardly from the inner face of the two members of the arm 6 extending into an annular groove in the body of the hub 4. The rod 7 is slidably mounted in bearings 9 at the extremity of the arms of the support 1. By manipulation of the rod 7 through suitable connections the clutch element may be moved longitudinally of the shaft 3.

A driven shaft 10 is mounted in a supporting bearing 11 formed in the upper cross arm of the support 1. The lower end of the shaft 10 extends downwardly adjacent to the shaft 3 and carries thereon a gear member 12. A collar 13 embraces the shaft 10 between the upper face of the gear member 12 and the face of the cross arm of the support. The shaft 10 is held in adjustment by a collar 14 disposed on the shaft above the bearing portion 11 and settable in rigid engagement with the shaft 10 by a set screw 15.

The gear member 12 includes a hub 16 which is pinned to the lower end of the shaft 10. A circular flange 17 extends from the lower end of the hub outwardly and has an annular series of teeth 18 formed integrally therewith and extending downwardly from its lower face adjacent to the outer edge thereof. The teeth 18 are formed with flat outer edges, the back edges being rounded as clearly shown in Fig. 3. The base of the teeth 18 are wider than their outer points, that is to say, the teeth taper from the base outwardly so that they will readily mesh with the teeth 5 of the clutch member.

As the teeth of the clutch member engage the teeth of the member 12 from the inside the rounded inner surface of the teeth 18, coming in contact with the rounded surface of the teeth 15 as the clutch member is moved to one side or the other of the axis of the member 12, permits the teeth of the clutch member and of the member 12 to come into full meshing position without jar, so that the clutch can be readily shifted at any point in the operation of the mechanism.

A second driven shaft 19 is supported in a bearing 20 in one arm of the support 1, said shaft extending into the support adjacent to the shaft 10. A pinion member comprising a hub 21 and a series of teeth 22 is pinned to the inner extremity of the shaft 19. The teeth 22 are round in cross section and are arranged to mesh with a series of teeth 23 extending at right angles thereto and arranged about the hub 16 of the member 12. The teeth 23 have a rounded outer edge as illustrated in the drawings and taper from the base upwardly, so that they may readily mesh with the teeth 22.

The operation of the gearing will be readily comprehended from the description of the construction.

It will also be understood that the elements may be modified in detail without departing from the spirit and scope of the invention. I do not limit myself to the exact construction shown and described, but what I claim and desire to secure by Letters Patent, is:—

1. A gearing comprising a support, a drive shaft journaled in said support, a driven shaft journaled in said support at right angles to the drive shaft, a gear member attached to the driven shaft and having an annular series of teeth extending at right angles to the drive shaft, an element longitudinally slidable on the drive shaft, a series of teeth at each end of said element parallel with the axis of the drive shaft, and means for moving said element to engage the teeth on opposite ends thereof alternately with the teeth on the gear member at opposite sides of the axis of the gear member.

2. A gearing, comprising a support, a horizontal shaft rotatably mounted in said support, a vertical shaft mounted in said suppport, a gear member on said vertical shaft comprising a hub, an outwardly extending flange and downwardly tapering teeth arranged on the lower face of the flange, an element on said horizontal shaft movable longitudinally thereof and comprising a hub having an annular series of teeth at their end, said teeth being round in cross section and adapted to be moved into mesh with the teeth on said gear member, and means for moving said element.

3. A gearing, comprising a support, a driven shaft disposed horizontally in said support and rotatable therein, a vertical shaft rotatably journaled in said support, a second horizontal shaft journaled in the support and disposed parallel to said first-named horizontally disposed shaft, a gear member mounted on the lower end of said vertical shaft comprising a hub, an annular flange having integrally formed depending teeth arranged in an annular series adjacent the edge thereof, a second series of teeth lying adjacent to the hub and extending verticallly, a pinion on said second-named horizontal shaft having a series of annular teeth adapted to mesh with the second series of teeth on said gear member, an element having a double annular series of teeth lying parallel with the axis of the first-named horizontal shaft, and means for moving said element.

4. A gearing construction, comprising a support, a shaft, a second shaft disposed at right angles to said first-named shaft, a gear member fixed to one of said shafts and having an annular series of teeth having rounded inner edges and tapering from the base outwardly, an element mounted on the other of said shafts within the circumference of a line drawn through the series of teeth on said gear member, a double annular series of teeth on said element, said teeth being round in cross section and extending at right angles to the teeth on the gear member, and means for sliding said element from one side to the other of the axis of the gear member, whereby one of said shafts may be driven in both directions from the other of said shafts.

5. A gearing comprising a drive shaft, an element slidable on said shaft, an annular series of teeth at one end of said element extending parallel with the axis of the shaft, a driven shaft supported at right angles to the drive shaft, a hub attached to the driven shaft, a flange rigid with said hub, an annular series of teeth extending from said flange parallel with the axis of the driven shaft, and means for moving said element to move the annular series of teeth thereon into and out of engagement with the annular series of teeth on said flange alternately on opposite sides of the axis of said flange, whereby said driven shaft will be rotated in alternately opposite directions by the constant rotation of said drive shaft in one direction.

6. Gearing comprising a drive shaft, an element slidable on said drive shaft, an annular series of teeth projecting from each end of said element parallel with the axis of said shaft, a driven shaft at right angles to the drive shaft, a flange supported by said driven shaft, an annular series of teeth rigid with said flange extending parallel with the axis of the driven shaft, and a device for moving said element on said driven shaft to engage the teeth on opposite ends thereof respectively with the teeth on said flange at opposite sides of the axis of the driven shaft.

7. A gearing comprising a drive shaft, an element slidable on said shaft, an annular series of teeth at one end of said element extending parallel with the axis of the shaft, a driven shaft supported at right angles to the drive shaft, a hub attached to the driven shaft, a flange rigid with said hub, an annular series of teeth extending from said flange parallel with the axis of the driven shaft, means for moving said element to move the annular series of teeth thereon into and out of engagement with the annular series of teeth on said flange, an additional driven shaft at right angles to the first-named driven shaft, and means for driving the additional driven shaft from the first-named driven shaft.

8. A gearing comprising a drive shaft, an element slidable on said shaft, an annular series of teeth at one end of said element extending parallel with the axis of the shaft, a driven shaft supported at right angles to the drive shaft, a hub attached to the driven shaft, a flange rigid with said hub, an annular series of teeth extending from said flange parallel with the axis of the driven shaft, means for moving said element to move the annular series of teeth thereon into and out of engagement with the annular series of teeth on said flange, an additional driven shaft parallel with the axis of the drive shaft, and means for driving the additional driven shaft from the first-named driven shaft.

9. Gearing comprising a drive shaft, an element movable on the drive shaft, an annular series of teeth at each end of said element extending parallel with the axis of the drive shaft, a driven shaft at right angles to the axis of the drive shaft, a flange rigid with the driven shaft, an annular series of teeth rigid with said flange, means for moving said element on the drive shaft to engage the teeth on opposite ends thereof alternately with the teeth supported by the driven shaft on opposite sides of the axis of the driven shaft, an additional annular series of teeth supported by the driven shaft, a second driven shaft at right angles to the first-named driven shaft, and an annular series of teeth rigid with the second driven shaft engaging the additional series of teeth on the first-named driven shaft.

In witness whereof, I have signed this specification.

WILLIAM H. SARGENT.

Copies of this patent may be obtained for five cents each, by addressing the "Commissioner of Patents, Washington, D. C."